United States Patent [19]
Chun

[11] Patent Number: 5,390,625
[45] Date of Patent: Feb. 21, 1995

[54] DRIVER'S OVERHEAD INDICATOR FOR AUTOMOBILE

[76] Inventor: Yea P. Chun, No. 3, Alley 1, Lane 364, Chung Hwa Road., Sec. 2,, Taipei, Taiwan, Prov. of China

[21] Appl. No.: 37,869

[22] Filed: Mar. 29, 1993

[51] Int. Cl.[6] .......................... G01P 5/00; G02B 7/198; G02B 27/00
[52] U.S. Cl. .................... 116/62.1; 359/436; 359/439; 353/14
[58] Field of Search .............. 116/57, 62.1, 62.4, 116/246, DIG. 15; 359/436, 437, 438, 439, 839, 857; 53/11, 12, 13, 14

[56] References Cited

U.S. PATENT DOCUMENTS

| | | | |
|---|---|---|---|
| 1,871,877 | 8/1932 | Buckman | 116/57 |
| 4,978,196 | 12/1990 | Suzuki et al. | 359/839 X |

FOREIGN PATENT DOCUMENTS

| | | | |
|---|---|---|---|
| 0238016 | 10/1986 | Japan | 359/439 |
| 3200426 | 9/1991 | Japan | 116/28 R |

Primary Examiner—William A. Cuchlinski, Jr.
Assistant Examiner—Willie Morris Worth
Attorney, Agent, or Firm—Lowe, Price, LeBlanc & Becker

[57] ABSTRACT

A driver's overhead indicator for automobile is a device using a reflecting plate in front of an instrument panel the image of which can be reflected through a secondary reflection onto a projecting plate which is installed on top of a dashboard. Both the reflecting plate and the projecting plate can be adjusted by a tightening member which is linked to a supporting frame, from which two stand members support and fasten to the body of the car. Said reflecting plate and said projecting plate were treated by a special layer of material such that the projecting plate maintains a clear background. The driver in a car can see the instrument panel from the projecting plate without looking at the instrument panel itself. This overhead indicating device can bypass the driver to look down at the instrument panel and avoid any possible accident that could arise while looking down.

1 Claim, 2 Drawing Sheets

DRIVER'S OVERHEAD INDICATOR FOR AUTOMOBILE

BACKGROUND OF THE INVENTION (a) Field of the Invention

The present invention relates to an overhead indicating device for a driver in an automobile. More specifically, the present invention relates to an indicating device used to reflect and project the view of an instrument panel in an automobile.

(b) Description of the Prior Art

The numbers of compact cars are growing rapidly and the rates of car accidents are also on a rising curve. Statistics indicate that the reaction time to avoid an accident is approximately 0.8 to 1.2 seconds. Accident arises if the driver does not react within this short time. The driver occasionally has to look at the instrument panel while driving. This may cause an accident if he does not react immediately to a change in the driving environment. The inventor has found that there is only one projecting indicating device available in the market today. Such a device is an electronic speedometer that projects the reading at the windshield. It has the following disadvantages:

1. The conventional projecting device can only display the speedometer reading. A driver still has to check for other reading such as oil, temperature and odometer in the instrument panel.

2. The conventional projecting device cannot be adjusted to the view of sight of different driver. The display is usually distorted.

3. The conventional projecting device is ineffective. The display cannot be read under a brighter light or reflection.

4. Its installation cost is relatively high.

Therefore, the inventor has invented the overhead indicator which reflects and projects the readings in the instrument panel to the driver.

SUMMARY OF THE INVENTION

The main object according to the present invention is to provide an automobile overhead indicating device in which the instrument panel readings are reflected twice to display in front of the driver. This prevents the possibility of an accident due to the driver looking down at the instrument panel.

Another object according to the present invention is to provide a reflecting indicator with a special surface such that the reflected indication is not affected by the brighter light. Moreover, the device is transparent so that the driver is able to observe and control the road condition.

A further object is to provide an automobile overhead indicating device in which the installation cost is low and the indicating result is effective.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
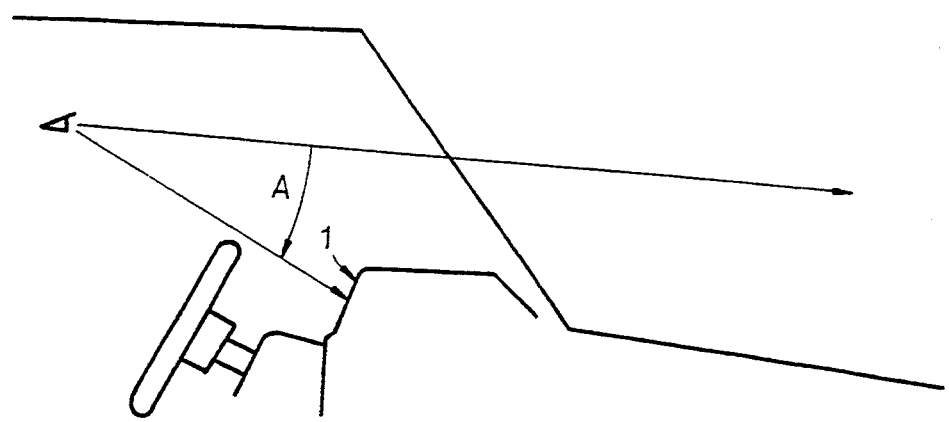
FIG. 1 is an illustrative drawing showing the angle that the driver looks down at the instrument panel during driving.
Figure 2:
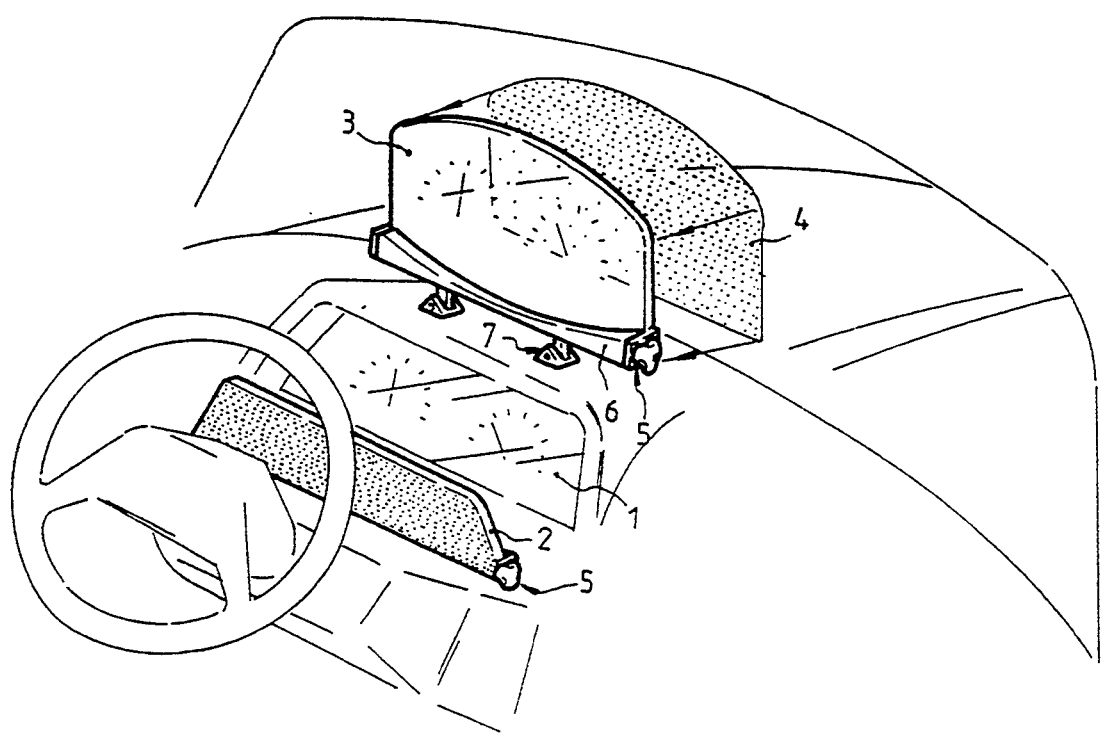
FIG. 2 is a perspective drawing showing the overhead indicating device installed in an automobile according to the present invention.
Figure 3:
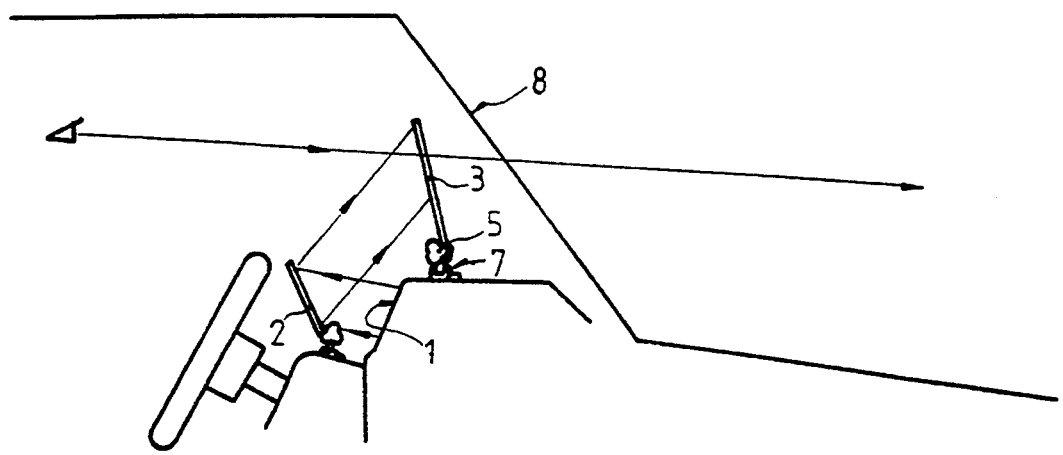
FIG. 3 is a drawing showing the operation of a preferred embodiment according to the present invention.

Referring to FIG. 1 which shows that a driver lowers his vision by an angle A to check for the readings in an instrument panel 1. It is easy for the driver to neglect the road condition while lowering his vision. Please refer to FIG. 2 for the assembly according to the present invention. The overhead indicator comprises a reflecting plate 2 which is installed in front of the instrument panel 1. Relative to the reflecting plate 2 is a projecting plate 3 which is located on a dashboard above the instrument panel 1. Both the reflecting plate and the projecting plate are attached with layers of special papers 4 in which the readings in the instrument panel 1 will not be affected by the brighter light. Such special papers 4 will also provide a clear background so that the driver can see the road condition. Both the reflecting plate 2 and the projecting plate 3 are adjustable relatively for the reflective picture through a tightening member 5 which is connected to a supporting frame 6. The reflecting plate 2 and the projecting plate 3 can also be folded up if the driver no longer requires them. The supporting frame 6 is attached to two stand members 7, which are bolted to the body of the car. No matter what body style the car has, the overhead indicating device can be used to display the instrument panel view on the projecting plate according to the present invention.

Figure 4:
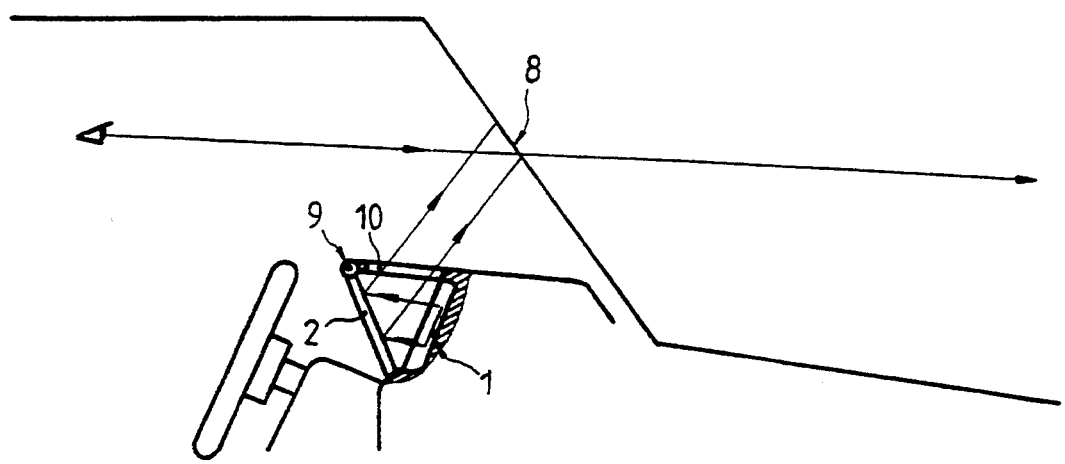
FIG. 4 is a drawing showing the operation of another embodiment according to the present invention.

Please refer to FIG. 4 for another embodiment of the overhead indicating device. The assembly can be modified by including the reflecting plate 2 as part of the instrument panel during the manufacturing of the automobile. A knob 9 is used to adjust the reflecting angle in such a way that the reflection goes through a clear panel 10 to display the picture on a windshield 8, which replaces the projecting plate 3 in the previous embodiment. The windshield 8 has to be fabricated with layers of the special paper 4 to get the same results as the projecting plate.

The foregoing embodiments are different in structures, but they described the functions of the overhead indicator using the principle of a secondary reflection. The view of the instrument panel therefore can be properly displayed on the projecting plate in the windshield.

While there have been shown and described what are considered at present to be the preferred embodiments of the present invention, it will be appreciated by those skilled in the art that modifications of such embodiments may be made. It is therefore desired that the invention not be limited to these embodiments, and it is intended to cover in the appended claims all such modifications as fall within the true spirit and scope of the invention.

What is claimed is:

1. An automobile overhead indicator for use with an automobile instrument panel dash and front windshield comprising a clear reflecting plate and a clear projecting plate, both plates being treated to provide a clear background and reflection; first adjustable support means attachable between said reflecting plate and dash, and second adjustable support means attachable between said projecting plate and dash, said projecting plate being adapted to be disposed above the dash, said reflecting plate reflecting an image of the instrument panel onto said projecting plate so that the driver can view the projection without looking directly at the instrument panel each of said first and second support means including a frame supporting the respective plate, at least one stand member adapted to be fixed to the dash and a tightening member means for permitting or arresting rotational movement of said stand and plate relative to said frame member so that the image viewed can be adjusted by the driver.

* * * * *